United States Patent [19]

Schaetzle et al.

[11] Patent Number: 4,507,925
[45] Date of Patent: Apr. 2, 1985

[54] METHOD FOR AND THERMAL ENERGY INJECTION WITHDRAWAL SYSTEM FOR AQUIFERS

[76] Inventors: Walter J. Schaetzle, P. O. Box 1523, Tuscaloosa, Ala. 35403; C. Everett Brett, 93 Canyon Rd., Tuscaloosa, Ala. 35406; Jasem M. Al-Ansari, Dhahran International Airport, P.O. Box 144, Dhahran, Saudi Arabia

[21] Appl. No.: 261,650

[22] Filed: May 7, 1981

[51] Int. Cl.³ .............................................. F03G 7/00
[52] U.S. Cl. ..................................... 60/641.4; 165/45; 137/493.1
[58] Field of Search ................. 165/45; 166/369, 370, 166/63, 65, 53; 137/493.1, 493.2, 493.4, 493.5, 493.6, 493.3; 60/641.1, 641.2, 641.4

[56] References Cited
U.S. PATENT DOCUMENTS

| | | | |
|---|---|---|---|
| 3,481,397 | 12/1969 | Baker | 137/493.1 |
| 3,931,851 | 1/1976 | Harris et al. | 165/2 |
| 3,965,972 | 6/1976 | Peterson | 165/45 |
| 4,125,163 | 11/1978 | Fitzpatrick | 166/53 |
| 4,157,730 | 6/1979 | Depois et al. | 165/45 |
| 4,248,305 | 2/1981 | Scarbrough | 165/45 |

Primary Examiner—William R. Cline
Attorney, Agent, or Firm—Oblon, Fisher, Spivak, McClelland & Maier

[57] ABSTRACT

A process has been invented to inject and withdraw water from an aquifer for purposes of energy storage under some abnormal conditions. This transfer system is for thermal energy storage applications where the transfer water pressure is higher than the normal aquifer pressure at the point of withdrawal or injection. Applications include systems where water temperatures are in excess of the normal boiling point and the water must be pressurized, to prevent boiling and/or and where an aquifer has a water head well below ground level creating excess pressure from the column of water from the surface to the acquifer. Water is injected through a process which reduces the pressure at the aquifer to the pressure required for injecting the correct water flow rate. In recovering the thermal energy, or withdrawal, the system provides the proper pressurization at aquifer level to the required pressure. The pressure is reduced by a uniquely controlled throttling valve or a uniquely controlled turbine-generator-valve combination.

15 Claims, 9 Drawing Figures

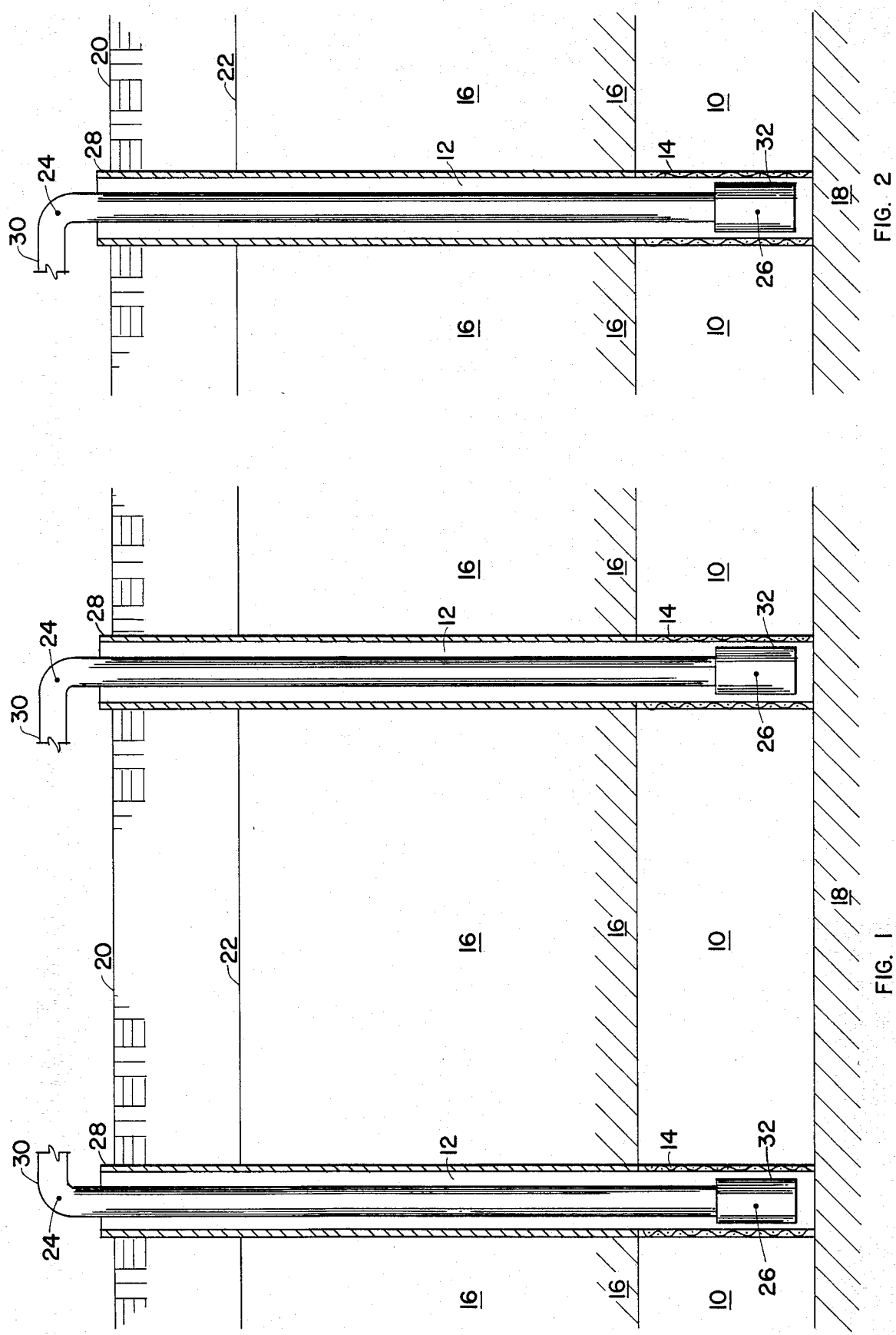

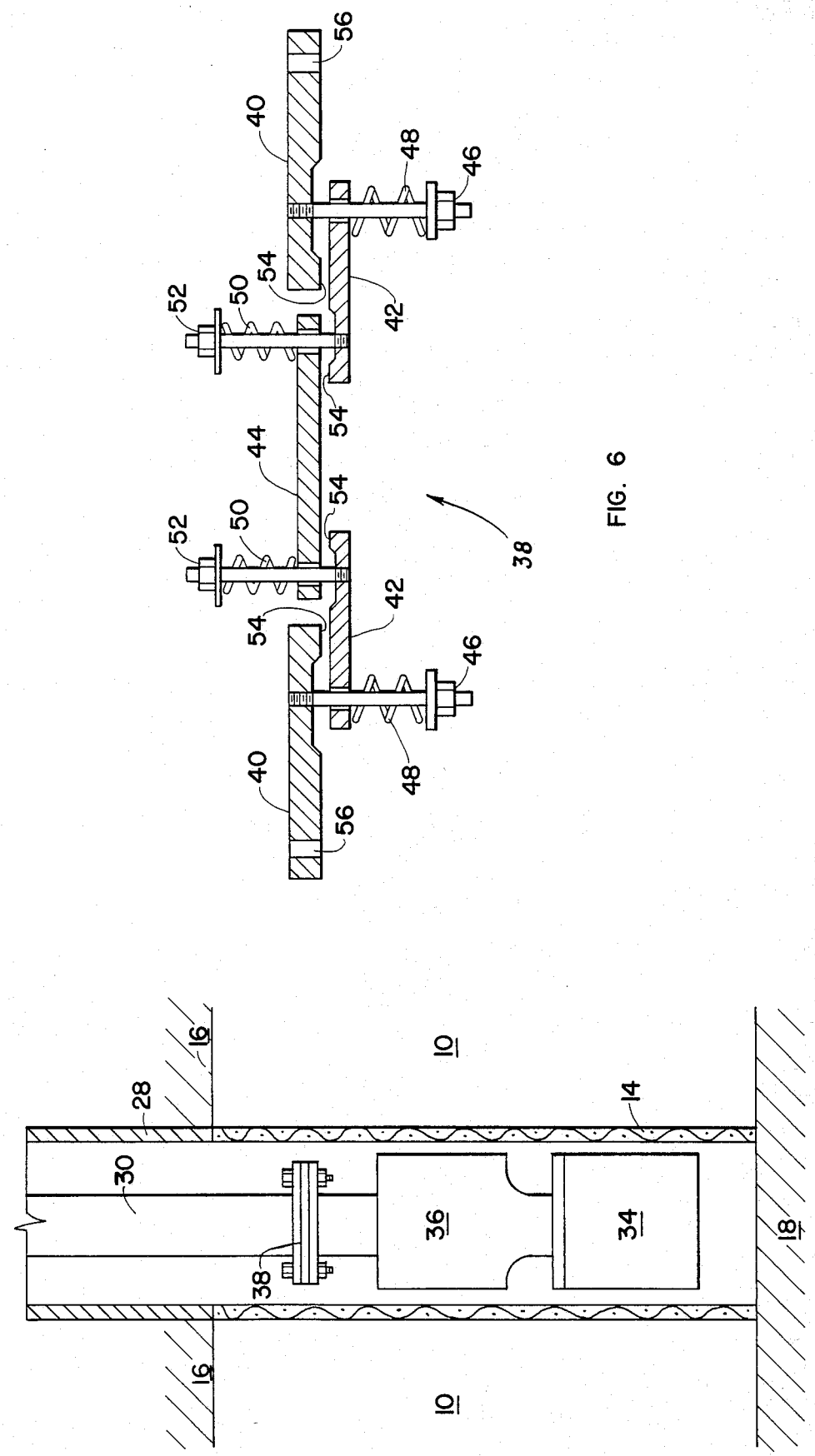

METHOD FOR AND THERMAL ENERGY INJECTION WITHDRAWAL SYSTEM FOR AQUIFERS

BACKGROUND OF INVENTION

1. Field of the Invention

The present invention is directed to a system for thermal energy injection-withdrawal, and more particularly a system for thermal energy injection-withdrawal for acquifers.

2. Description of the Prior Art

Aquifers are an underground porous media provided by nature through which water can flow. By heating or cooling water and transferring the water into an aquifer, a thermal storage or thermal energy sink is created. Access to the aquifer(s) is provided by a number of wells between the surface and the aquifer. For example, U.S. Pat. Nos. 3,931,851 and 3,965,972 suggest heating and cooling systems which use aquifer thermal energy storage. The literature has a number of heating and cooling systems using aquifer thermal energy storage prior to these patents.

Aquifers can provide extremely large thermal energy storage systems which have been produced by nature at a very economical cost to man. Most man-made large scale thermal energy storage systems cost one or more orders of magnitude more than the aquifer system. The cost of the thermal energy storage system is the series of walls between the underground aquifer and the surface. The thermal energy storage periods in an aquifer can be for a few hours up to a number of years. The percentage of energy recovered, even on an annual basis, is predicted to be higher than the performance of man-made devices.

A number of experimental tests and many limited applications of aquifer thermal energy storage have taken place. In some of these tests, the confining layers of the aquifer have ruptured upon water injection due to excess pressure. These pressures will be even greater for high temperature water which must be pressurized to prevent boiling. For example, 400° F. water must be pressurized to 247 Psia to prevent boiling. If the water were allowed to boil, the temperature would drop very rapidly. If the pressure at the surface is 247 Psia, the pressure at the aquifer level is equal to 247 Psia plus the pressure due to the column of water in the injection pipe from the surface to the aquifer level. This pressure is much higher than the normal aquifer pressure, thereby requiring an extremely high injection flow rate to maintain pressure. If the pressure drops, the water boils and cavitation occurs. The aquifer and depth determine the minimum flow rate. This invention eliminates this restriction.

Similar excess pressure exists when the aquifer piezometric surface (water table) is far below the ground surface. The pressure due to the column of water from the surface to the piezometric surface is excess pressure. A high flow rate is again required to prevent cavitation.

In both the above cases, the injection water pressure is much higher than aquifer pressure. The pressure must be reduced to a pressure which provides injection flow rates rather than pressure differences caused by other related variables. If the injection pressures are excessive, the flow rate into the aquifer will be high and the water in the pipe to the surface will cavitate and/or the confining layers of the aquifer will fracture (blow out). Upon water withdrawal, the water pressure must be matched to required surface pressure.

It is not possible to store high temperature water in aquifers or to store cold water in deep aquifers at limited pressures without the invention herein described. Under these special conditions, water cannot be injected or recovered through an open tube injection/recovery system. Conventional pressure regulators will not provide required pressure reduction since a variable pressure as a function of flow rate is required.

SUMMARY OF INVENTION

The present invention relates to means for injecting and withdrawing thermal energy from a thermal energy storage system (high or low temperature) in an aquifer. The transfer of thermal energy between the aquifer and applications such as heating and cooling, producing process heat, a power plant, etc. is by water. Water transfers thermal energy to the aquifer through one or more wells which connect the aquifer to the surface. This invention is required for high temperature storage (above the boiling point of the water) and/or for deep aquifers where the piezometric surface (water table) is appreciably below the earth's surface. Under these conditions, uncontrolled water injection will prevent effective operation of the system. The invention controls the water pressure at the injection point into the aquifer as a function of flow rate and a normal predetermined aquifer pressure. The invention operates equally well with single well injection-withdrawal or multiple well systems such as a doublet.

The invention reduces the water pressure at the point of injection to the static pressure of the aquifer plus the pressure required to inject the proper water flow rate into the aquifer. Direct, uncontrolled water injection will cause either cavitation or excess pressure or both under these special conditions. Water pressure must be controlled. A purely mechanical system of throttling the pressure is one option and a turbine-generator combination with a closed loop control system is a second option.

The mechanical system uses a semi-one-way valve for withdrawal. The one-way valve allows water withdrawal with a very low pressure loss yet allows the pressure to be throttled during injection into the aquifer. Withdrawal flow and injection flow are controlled by spring mounted valves. All available work in the pressurized water in injection is lost in this option.

The turbine-generator option throttles the pressure in a turbine producing work. To control the pressure as a function of aquifer static pressure and flow rate, a closed loop control system which opens and closes valves and controls the generator output is required. The prime purpose of this system is to control the pressure at the aquifer injection point, not to recover energy. Energy recovery is incidental to the process.

BRIEF DESCRIPTION OF THE DRAWINGS

The objects and advantages of the invention are found in the following specifications of the preferred embodiment of the invention. Other objects of the invention will become aparent in view of the following description. In the drawings forming a part of this application, like parts are identified by like numerals throughout the same and wherein:

FIG. 1 is a sectional view of a confined aquifer, a pair of wells (doublet system), the surface, the pipelines, and a location for the present invention.

FIG. 2 is a sectional view of a confined aquifer with a single well, the surface, the pipelines, and a location for the invention.

FIG. 5 is a view at the water injection location showing the location of the motor-pump and the mechanical control system.

FIG. 6 is a view of a mechanical pressure control system for controlling pressure.

DETAILED DESCRIPTION OF THE PREFERRED EMBODIMENTS

Figure 4:
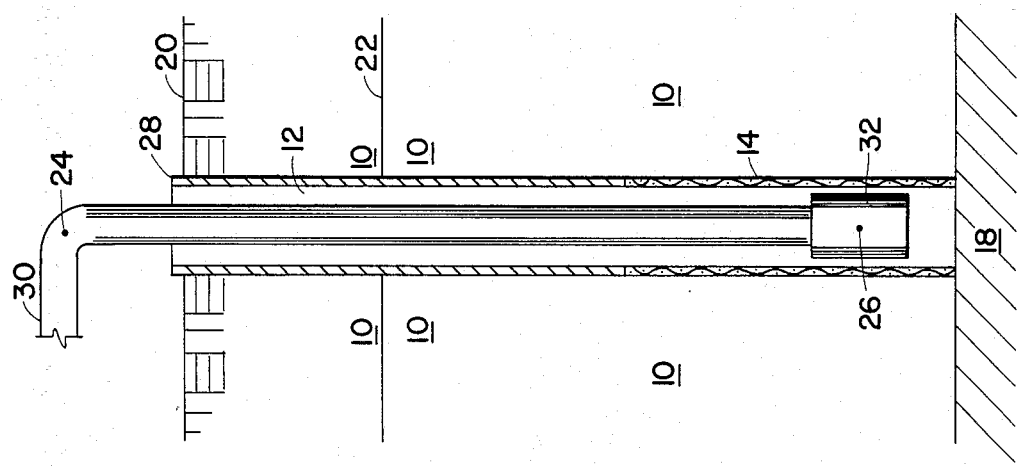
FIG. 4 is a sectional view of an aquifer confined only on the bottom, a single well, the surface, the pipelines, and a location for the invention.

Referring to FIG. 1, two wells connect the surface 20 with a confined aquifer 10. Solid well casing 28 projects from just above the surface 20 to the top of the aquifer 10 and connects with a porous casing member 14. The aquifer is confined between two confining layers 16 on the top and 18 on the bottom. The piezometric surface 22 or water table height is shown at the normal height. Inside the well casing 28 a pipe 30 acts as a conduit for the water entering and leaving the well. The pressure control system 32 is located at the end of the pipe at vertical height 26. The pressure change of the invention occurs in the pressure control system 32 at the bottom end of the pipe 30. The pipe 30 need not necessarily extend into the aquifer 10 but can end in the solid well casing 28 depending on the depth of aquifer 10 and piezometric surface 22.

In the two well system FIG. 1, water is injected into one well and withdrawn from the opposite well. The flow rates at each well are identical, for each gallon of water injected a gallon of water is withdrawn. One well will be the hot well and one well will be the cold well. As hot or cold water is injected, a water front and a thermal front move between the two wells. To withdraw the hot or cold water, the flow rate direction is reversed or the injection well becomes the withdrawal well and the withdrawal well becomes the injection well. A series of injection wells rather than a single well and a series of withdrawal wells instead of a single well can be used.

The absolute pressure of the water in the aquifer 10 is equal to pressure created by the vertical head of water from the piezometric surface to the vertical location in the aquifer plus atmospheric pressure. The pressure on the surface side of the pressure control system 32 is equal to the pressure at location 24 plus the pressure due to the water head represented by vertical distance from location 24 to the pressure control system height 26. This pressure will always be much higher than the aquifer pressure for a pressurized water system at the surface (required for temperatures above the boiling point) and for regular systems where the piezometric surface is well below the surface of the ground.

To inject water requires a pressure head above the aquifer pressure which normally varies from a few feet to 50 feet of water above the normal aquifer pressure head. To protect the aquifer and/or eliminate cavitation in the piping system, the process of the present invention has been devised to reduce the high pressure head to the required pressure head. The controlled pressure reduction takes place in the pressure control system 32. Two types of systems, one purely mechanical and one with a closed or open loop control system are analyzed in later figures. In order to maintain control over the water flow without cavitation, such a device is required. The pressure reduction also must be variable.

Referring to FIG. 2, a single well 12 connects the surface 20 with a confined aquifer 10. The explanation of FIG. 2 is identical to FIG. 1 except a single well 12 is utilized rather than multiple wells. The water is injected and withdrawn from the single well 12. This requires an external source of water for injection and a discharge source for water upon withdrawal. The system is required to effectively operate high temperature water and normal temperature hot or cold water where the water table is well below the surface.

Figure 3:
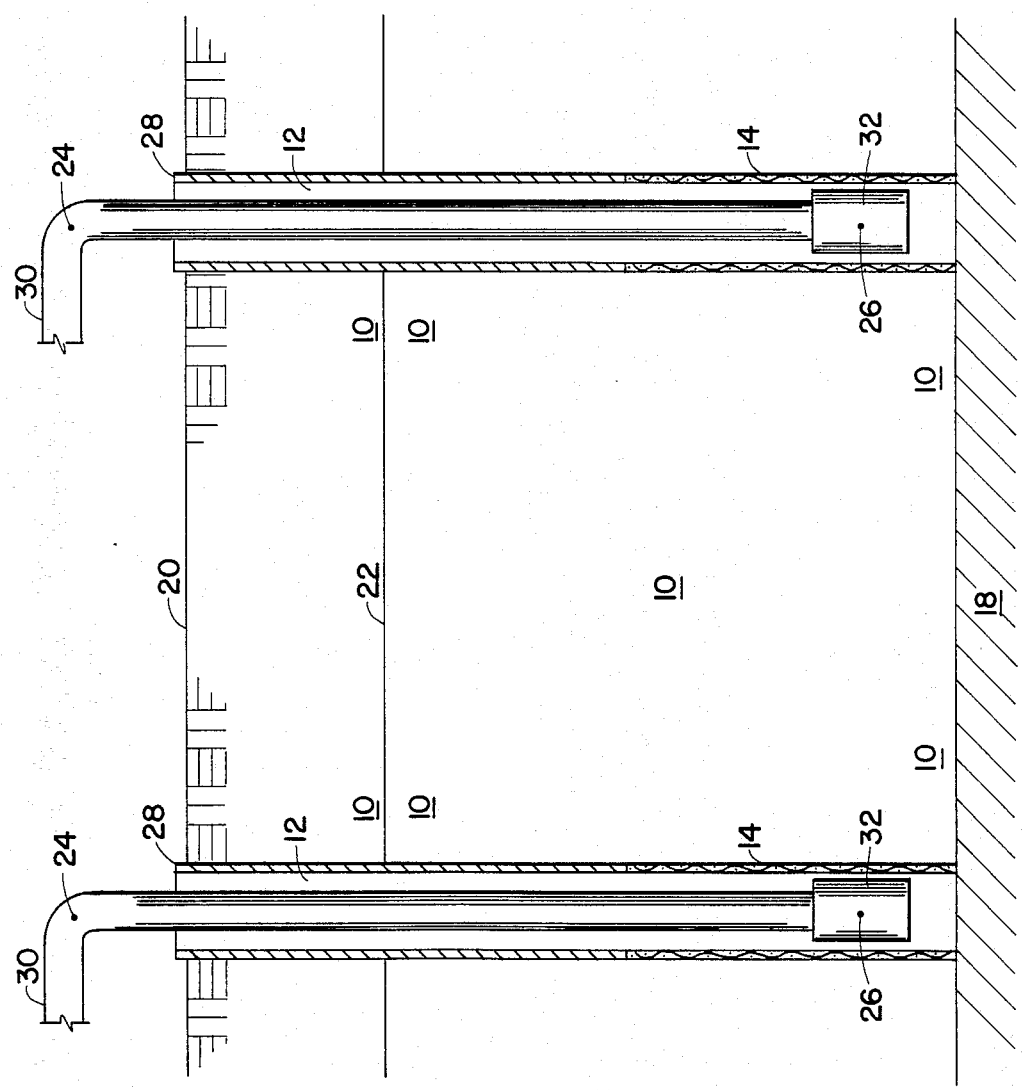
FIG. 3 is a sectional view of an aquifer confined only on the bottom, a pair of wells (the doublet system), the surface, the pipelines, and a location for the invention.

Referring to FIG. 3, a system similar to FIG. 1 is shown except the aquifer 10 is confined only on the bottom 18. The water table height 22 in the aquifer 10 and piezometric surface 22 are at the same height in this case. This system will not operate with high temperature water as the water will boil, but the invention is required for water at cold and warm temperatures when the piezometric surface 22 is well below the ground surface 20.

The invention is required to control water flow without cavitation.

Referring to FIG. 4, a system similar to FIG. 2 is shown with an aquifer 10 confined only on the bottom 18. A single well 12 connects the surface 20 with the aquifer 10. The same restrictions as in FIG. 2 and FIG. 3 apply.

Referring to FIG. 5, the relative locations of the submersible system consisting of the pump 36, the motor 34, and the mechanical pressure control 38, are attached to the end of the connecting pipe 30. The sum of these parts make up the mechanical version of the pressure control system. The pump 36 and motor 34 are a standard submersible pump system upgraded for high temperatures.

Referring to FIG. 6, a cross-sectional view of a possible mechanical pressure control system 38 is shown. Flange 40 is a circular section with a circular hole which is fastened in pipe section 30 with a flange at control system 38 (FIG. 5). Attached to flange 40 through a rod, nut and guide 46 and spring 48 is a second circular flange 42 with a circular hole. The flange 42 moves downwards when a sufficient force (pressure) is applied on the bolt, washer, and nut guides 46. These guides 46 keep the flange in the proper alignment at all locations as the flange 42 moves up or down with respect to flange 40. Two or more guides will be used. The flange 42 will move down, open, and allow water to pass when the pressure above the system 38 is sufficiently higher than the pressure below the system 38. The pressure differences for opening at a specific flow rate can be set by adjusting the compression in the springs 48. The spring 48 compression must be set to provide the proper pressure drop across the system 38. This pressure drop is a function of aquifer depth, piezometric surface depth, and surface pressure. The pressure must be reduced to a value which provides just sufficient pressure for the water flow to be injected into the aquifer. Insufficient pressure drop could rupture the aquifer and/or cause cavitation in pipe 30. This allows flow control. The forced flow will automatically adjust the pressure changes for a properly set system.

Circular flange 44 is attached to flange 42 with a similar guide 52 system. This flange 44 acts as a one way valve to allow the water to pass upwards during pumping with a small pressure loss. The springs 50 have a very low compression load and are only inserted to keep the flange in place.

Seats 54 are machined into each flange to provide sealing. The seats 54 could be replaced with o-rings or other seals. The system 38 is flanged to the pipe with holes 56. Normally two, four, six, or eight holes 56 will be used.

The mechanical pressure control system 38, allows water to pass upwards for withdrawal and pumping with little or no pressure loss. The downward movement of water has a pressure drop which can be preset. This allows water injection into the aquifer.

The controlled pressure control system uses an open-shut valve 66 (FIG. 7) in the place of the mechanical pressure control system 38 and a motor 34-pump 36 system (FIG. 5) which converts to a turbine 64-generator 62 system (FIG. 7) when the flow is reversed. The motor 62-pump 64 system (FIG. 7) pumps the water for withdrawal and the turbine 64-generator 62 system provides the required pressure drop with energy recovery. This requires a pump 64 which operates as a turbine 64 when flow is reversed and a motor 62 which acts as a generator 62 when armature is rotated. Care must be taken to use a pump 64 which automatically transforms to a turbine and a motor 62 which automatically transforms to a generator. Additional leads are required to the motor so field and armature current and voltage can be independently controlled.

Figure 7:
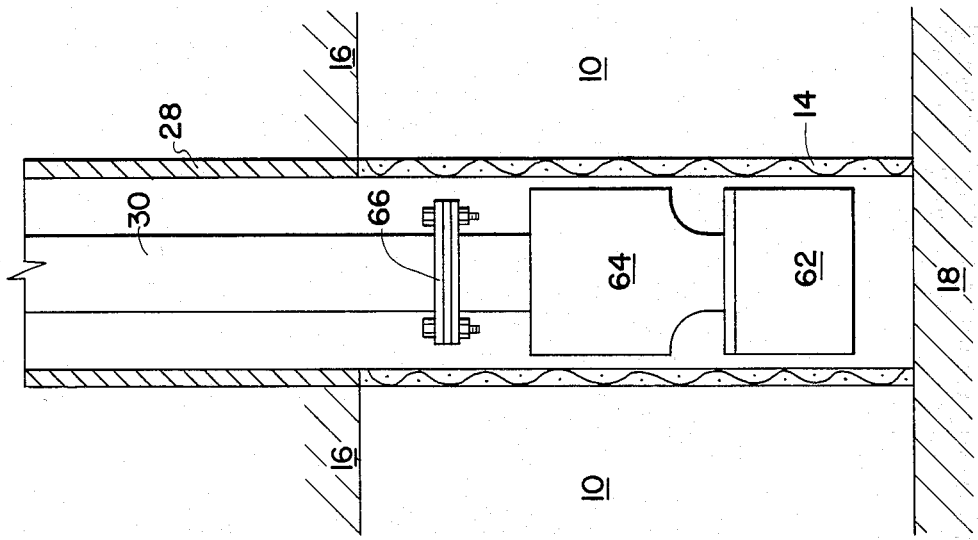
FIG. 7 is a view of the water injection location showing the pump-turbine, the motor-generator and water valve location.

Referring to FIG. 7, the relative locations of the submersible system of the pump-turbine 64, the motor-generator 62, and the mechanical open-shut valve 66 are shown connecting to the pipe 30. The sum of these parts plus a control system make up the controlled version of the pressure control system.

Figure 8:
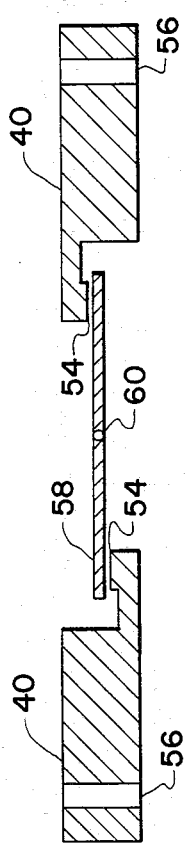
FIG. 8 is a cross-sectional view of a possible mechanical valve for the controlled pressure control system.

Referring to FIG. 8, a cross-section of one of many possible mechanical open-shut or on-off valves is shown. The butterfly valve 58 is mounted in a similar flange 40 inserted in pipe 30 as is the mechanical control system flange. It has sealing surfaces 54 and connecting bolt holes 56. The valve can be controlled by a solenoid, motor, or mechanical linkage. Any type on-off valves can be used.

When the overall system is injecting or withdrawing water, the valve is in a wide open position. During the pumping phase (withdrawal) the motor 62-pump 64 is in the on mode and no adjustment is required. However, the motor field current or overall voltage could be controlled to adjust flow rate or pressure.

During injection, the turbine 64-generator 62 must be controlled as a function of flow rate and/or pressure. This is accomplished by adjusting the field current and thereby the voltage output of the generator 62. By increasing field current, flow rate will be decreased, the pressure drop will increase and generator 62 output voltage will increase. By lowering field current, flow rate will decrease, the pressure drop will decrease, and the generator 62 output voltage will decrease. A microprocessor can be used to control the system.

Potential energy is lost across the pressure decrease with the basic pressure control system 38. Some of this energy is recovered with the substitution of the controlled system. This energy is recovered as work and converted to electrical energy. It will be economically feasible only in extremely large thermal energy storage systems with high water flow rates. The purpose of this invention is the control of the system, not the work recovery.

Figure 9:
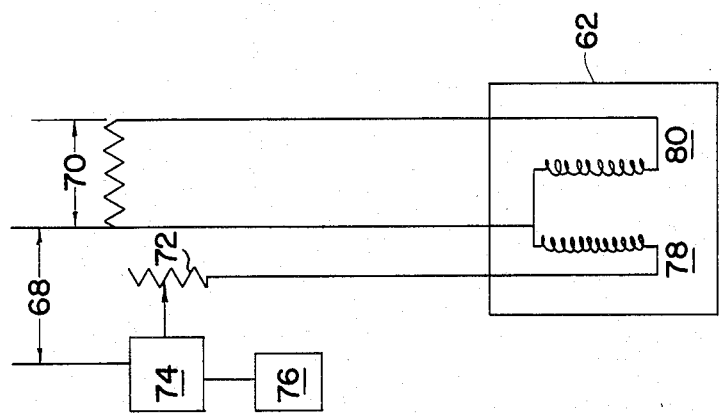
FIG. 9 is a schematic of a closed loop control system for injection and withdrawal with the turbine-generator and pump-motor system.

Referring to FIG. 9, a possible schematic of the control system for the generator 62 is shown. The generator field 78 and the armature current and voltage (through armature 82) can be controlled from the surface. A pressure sensor or flow sensor 76 controls the voltage input 72 to the generator field 78. A microprocessor 74 can be programed to provide the correct output 72 as a function of water pressure or water flow rate. A second control is available by changing the output lead 70 on the generator 62. The system for water injection and pressure drop is controlled by controlling generator 62 input variables with closed loop feedback of pressure and/or water flow rate.

Obviously, numerous modifications and variations of the present invention are possible in light of the above teachings. It is therefore to be understood that within the scope of the appended claims, the invention may be practiced otherwise than as specifically described herein.

What is claimed is:

1. A process for the control of water injection into and water withdrawal from an aquifer under a normal predetermined pressure via at least one well which utilizes a pressure control system having a first valve and a one-way valve each mounted within said at least one well and means for adjusting the spacing between said first valve and said one-way valve, which comprises:

injecting thermal energy into and withdrawing thermal energy from said aquifer via said at least one well under water pressure;

controlling, via said first valve of said pressure control system, said water pressure at a point of injection as a function of flow rate and said normal predetermined pressure so as to reduce the water pressure at said point of injection to a value equal to the static pressure of said aquifer plus a predetermined pressure required to inject water at a predetermined rate of flow into the aquifer such that said one-way valve allows for water withdrawal with relatively low pressure loss and allows for the water pressure to be throttled via said first valve during injection water into the aquifer so as to prevent cavitation.

2. A process as set forth in claim 1, wherein said reduction of pressure further comprises reducing pressure in said well at a point within or adjacent to the depth of said aquifer.

3. A process as set forth in claim 2, wherein said controlling of said water pressure further comprises controlling incoming water pressure to said aquifer.

4. A process as set forth in claim 1, wherein said injecting thermal energy into and withdrawing thermal energy from said at least one well further comprises injecting thermal energy into and withdrawing thermal energy from a plurality of wells.

5. A process for the control of water injection into and water withdrawal from an aquifer under a normal predetermined pressure via at least one well which utilizes an open-shut valve and a motor-pump system positioned in said at least one well and which is convertible to a turbine-generator system for reverse water flow within said at least one well, which comprises:

injecting thermal energy into and withdrawing thermal energy from said aquifer via said at least one well under water pressure; and controlling, via said open-shut valve and said motor-pump-turbine-generator system, said water pressure at a point of injection as a function of flow rate and said normal predetermined pressure so as to reduce the water pressure of said point of injection to a value equal to the static pressure of said aquifer plus a predetermined pressure required to inject water at a predetermined rate of flow into the aquifer;

opening said open-shut valve during injection and withdrawal of said thermal energy; and controlling the voltage output of said generator of said turbine-generator during injection of said thermal energy as a function of water flow rate.

6. A process for the control of water injection into and water withdrawal from an aquifer under a normal predetermined pressure via at least one well which utilizes an open-shut valve and a motor-pump system positioned in said at least one well and which is convertible to a turbine-generator system for reverse water flow within said at least one well, which comprises:

injecting thermal energy into and withdrawing thermal energy from said aquifer via said at least one well under water pressure; and controlling, via said open-shut valve and said motor-pump-turbine-generator system, said water pressure at a point of injection as a function of flow rate and said normal predetermined pressure so as to reduce the water pressure of said point of injection to a value equal to the static pressure of said aquifer plus a predetermined pressure required to inject water at a predetermined rate of flow into the aquifer;

opening said open-shut valve during injection and withdrawal of said thermal energy; and controlling the voltage output of said generator of said turbine-generator during injection of said thermal energy as a function of pressure.

7. A process for the control of water injection into and water withdrawal from an aquifer under a normal predetermined pressure via at least one well which utilizes an open-shut valve and a motor-pump system positioned in said at least one well and which is convertible to a turbine-generator system for reverse water flow within said at least one well, which comprises:

injecting thermal energy into and withdrawing thermal energy from said aquifer via said at least one well under water pressure; and controlling, via said open-shut valve and said motor-pump-turbine-generator system, said water pressure at a point of injection as a function of flow rate and said normal predetermined pressure so as to reduce the water pressure of said point of injection to a value equal to the static pressure of said aquifer plus a predetermined pressure required to inject water at a predetermined rate of flow into the aquifer;

opening said open-shut valve during injection and withdrawal of said thermal energy; and controlling the voltage output of said generator of said turbine-generator during injection of said thermal energy as a function of water flow rate and pressure.

8. An apparatus for the control of water injection into said withdrawal of water from an aquifer via at least one well, comprising:

means for injecting thermal energy into and withdrawing thermal energy from said aquifer via said at least one well under water pressure; and means for controlling said water pressure at a point of injection as a function of flow rate and a normal predetermined pressure of said aquifer so as to reduce the water pressure at said point of injection to a value equal to the static pressure of said aquifer plus a predetermined pressure required to inject water at a predetermined rate of flow into the aquifer wherein said means for injecting thermal energy into and withdrawing thermal energy from said aquifer further comprises one-way valve means mounted in said at least one well for water withdrawal with a relatively low pressure loss and second valve means mounted in said at least one well and operatively associated with said one-way valve means for throttling the water pressure during injection of water into the aquifer and for preventing cavitation.

9. An apparatus as set forth in claim 8, wherein said means for injecting thermal energy into and withdrawing thermal energy from said aquifer is located within said aquifer.

10. An apparatus as set forth in claim 8, wherein said means for controlling said water pressure further comprises means for controlling incoming water pressure to said aquifer.

11. An apparatus as set forth in claim 8, wherein said means for injecting thermal energy into and withdrawing thermal energy from said aquifer from further comprises means for injecting thermal energy into and withdrawing thermal energy from a plurality of wells.

12. An apparatus as set forth in claim 8, wherein:

said means for injecting thermal energy into and withdrawing thermal energy from said aquifer is located within said aquifer;

said means for controlling said water pressure further comprises means for controlling incoming water pressure to said aquifer; and said means for injecting thermal energy into and withdrawing thermal energy from said aquifer from further comprises means for injecting thermal energy into and withdrawing thermal energy from a plurality of wells.

13. An apparatus for the control of water injection into and withdrawal of water from an aquifer via at least one well, comprising:

means for injecting thermal energy into and withdrawing thermal energy from said aquifer via said at least one well under water pressure; and means for controlling said water pressure at a point of injection as a function of flow rate and a normal predetermined pressure of said aquifer so as to reduce the water pressure at said point of injection to a value equal to the static pressure of said aquifer plus a predetermined pressure required to inject water at a predetermined rate of flow into the aquifer wherein said means for injecting thermal energy into and withdrawing thermal energy from further comprises open-shut valve means open during injection of said thermal energy, motor-pump-tubrine-generator means mounted within said at least one well and operatively associated with said open-shut valve means, and means for controlling the voltage output of said generator during injection of said thermal energy as a function of water flow rate.

14. An apparatus for the control of water injection into and withdrawal of water from an aquifer via at least one well, comprising:
   means for injecting thermal energy into and withdrawing thermal energy from said aquifer via said at least one well under water pressure; and
   means for controlling said water pressure at a point of injection as a function of flow rate and a normal predetermined pressure of said aquifer so as to reduce the water pressure at said point of injection to a value equal to the static pressure of said aquifer plus a predetermined pressure required to inject water at a predetermined rate of flow into the aquifer wherein said means for injecting thermal energy into and withdrawing thermal energy from further comprises open-shut valve means open during injection of said thermal energy, motor-pump-turbine-generator means mounted within said at least one well and operatively associated with said open-shut valve means, and means for controlling the voltage output of said generator during injection of said thermal energy as a function of pressure.

15. An apparatus for the control of water injection into and withdrawal of water from an aquifer via at least one well, comprising:
   means for injecting thermal energy into and withdrawing thermal energy from said aquifer via said at least one well under water pressure; and
   means for controlling said water pressure at a point of injection as a function of flow rate and a normal predetermined pressure of said aquifer so as to reduce the water pressure at said point of injection to a value equal to the static pressure of said aquifer plus a predetermined pressure required to inject water at a predetermined rate of flow into the aquifer wherein said means for injecting thermal energy into and withdrawing thermal energy from further comprises open-shut valve means open during injection of said thermal energy, motor-pump-turbine-generator means mounted within said at least one well and operatively associated with said open-shut valve means, and means for controlling the voltage output of said generator during injection of said thermal energy as a function of water flow rate and pressure.

* * * * *